United States Patent [19]

Winzeler et al.

[11] 3,823,802

[45] July 16, 1974

[54] CLUTCH WITH CONTROLLED COOLANT FLOW

[75] Inventors: James E. Winzeler; William M. McClure, both of East Peoria, Ill.

[73] Assignee: Caterpillar Tractor Co., Peoria, Ill.

[22] Filed: Aug. 18, 1972

[21] Appl. No.: 281,913

[52] U.S. Cl............ 192/113 B, 192/86, 192/106 F
[51] Int. Cl............................................. F16d 13/72
[58] Field of Search............... 192/113 B, 86, 106 F

[56] References Cited
UNITED STATES PATENTS

| | | | |
|---|---|---|---|
| 2,178,017 | 10/1939 | Fedden et al. | 192/86 |
| 2,939,558 | 6/1960 | Schjolin | 192/106 F |
| 3,105,582 | 10/1963 | Ziabicki | 192/113 B |

FOREIGN PATENTS OR APPLICATIONS 1,181,011  11/1964  Germany.................... 192/113 B

*Primary Examiner*—Benjamin W. Wyche
*Attorney, Agent, or Firm*—Phillips, Moore, Weissenberger Lempio & Strabala

[57] ABSTRACT

A rotating clutch having a plurality of friction plates includes a plate cooling and lubrication system which maximizes supply of the coolant fluid thereto upon engagement of the clutch. Such maximized supply aids in the release of the clutch by utilization of the pressure of such supply of fluid in the clutch, and also by utilization of the centrifugal pressure head of such supply of fluid within the clutch.

5 Claims, 2 Drawing Figures

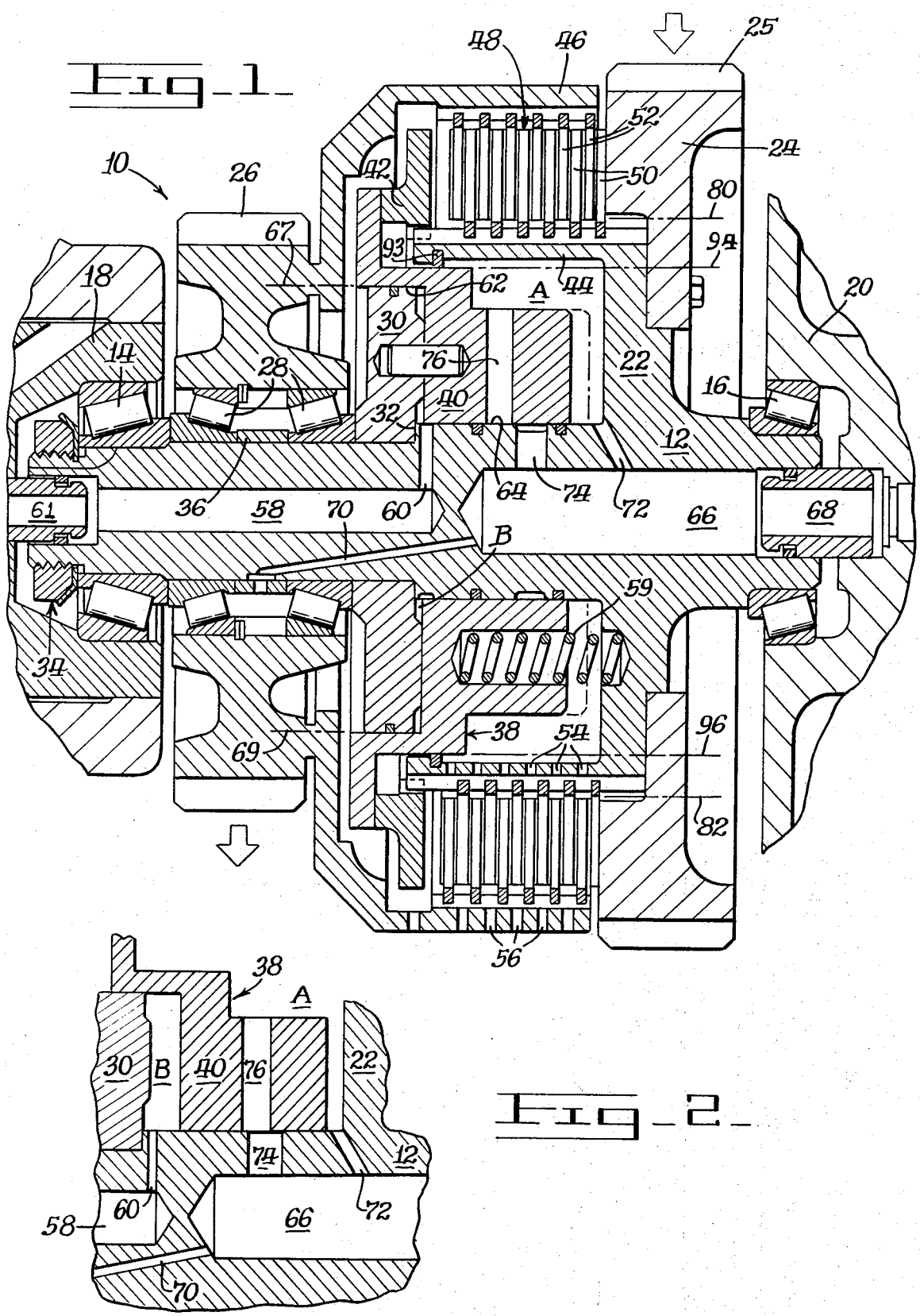

3,823,802

CLUTCH WITH CONTROLLED COOLANT FLOW

BACKGROUND OF THE INVENTION

This invention relates to clutches, and more particularly, to a rotating clutch which includes a friction plate lubrication system.

In modern clutch systems incorporating multiple friction plates, it is well known to provide means for supplying lubricating fluid to the plates. Such a supply of fluid is generally included for the purpose of cooling the plates, and for providing smooth operation of the clutch.

Generally, the known clutches which incorporate such a system are designed so that, as the friction plates are engaged, supply thereto of fluid is cut down or off completely, or at best remains constant. Such is the case in U.S. Pat. Nos. 2,657,468 to Hobbs, No. 2,690,248 to McDowall, No. 2,837,192 to Dunkelow, No. 2,869,701 to Yokel, No. 3,136,389 to Cummins (assigned to the assignee of this application), No. 3,145,816 to DeLorean et al., No. 3,243,026 to Snoy et al, No. 3,301,359 to Cole et al. (assigned to the assignee of this application), No. 3,321,999 to Greer, No. 3,334,717, to Spokas et al., and German Pat. No. 862,237. While such systems do provide certain advantages, it would be desirable, it has been found, to provide a system which increases supply of fluid to the friction plates upon engagement of the clutch. With such a system, thermal energy absorption capabilities of the plates would be increased in the engaging and engaged states. Clutch drag or horsepower loss to heat would be decreased when the clutch is disengaged, because of decreased coolant flow in this state.

While such systems in the broad sense are known (see U.S. Pat. Nos. 3,105,582 to Ziabicki, and No. 3,292,758 to Polak), a study of these patents reveals that each includes relatively complex valving and porting means for maximizing supply of fluid to the friction plates upon engagement of the friction plates. It would therefore be of advantage to provide a system which, while maximizing lubricating fluid supply to the plates upon engagement, is also extremely simple in design and operation.

The systems incorporated in rotating clutches usually employ a source of hydraulic fluid under high pressure for the purpose of affecting clutch engagement. A difficulty encountered in the use of rotating clutches of this type is their tendency to remain engaged even in the absence of hydraulic pressure from the clutch-engaging source. This is generally due to the fact that the entire clutch rotates at a high rate of speed, creating force, due to the centrifugal action of trapped actuating fluid which is sufficient to maintain the clutch engaged. While U.S. Pat. No. 3,217,851 to Mogk et al. (assigned to the assignee of this application), discloses a system which overcomes this problem by providing a counterbalancing mechanism utilizing fluid provided therein, such fluid is not in addition used as a clutch plate coolant, with the advantages which would be attendant thereto.

SUMMARY OF THE INVENTION

It is therefore an object of this invention to provide a clutch which includes a friction plate cooling system which provides means for maximizing supply of the cooling fluid to the plates upon engagement thereof.

It is a further object of this invention to provide a clutch which, while fulfilling the above object, utilizes the maximized supply of fluid upon engagement to urge the clutch-applying means in a clutch-releasing direction.

It is a still further object of this invention to provide a clutch which, while fulfilling the above objects, is extremely simple in design and effective in operation.

Broadly stated, the invention herein is a clutch comprising a plurality of annular friction plates, and an annular reaction member disposed on one side of the plates. Piston means are disposed on the other side of the plates, and are movable toward the reaction member to engage the plates, and away from the reaction member to release the plates. A first passage is included for conducting cooling fluid to adjacent the piston means. A second passage is defined by the piston means and communicates with the first passage with the piston means moved to engage the plates, allowing maximum cooling fluid supply to the plates, the piston means blocking the first passage with the piston means moved to release the plates, the supply through the first and second passages to the plates varying from minimum to maximum as the piston means are moved from a plate-released to a plate-engaged position, and from maximum to minimum as the piston means are moved from a plate-engaged to a plate-released position.

BRIEF DESCRIPTION OF THE DRAWINGS

These and other objects of the invention will become apparent from a study of the following specification and drawings, in which:

FIG. 1 is a sectional view of a clutch incorporating the inventive system, with the clutch in a disengaged position; and, FIG. 2 is a fragmentary sectional elevation showing the clutch in an engaged position.

DESCRIPTION OF THE PREFERRED EMBODIMENT

Shown generally in FIG. 1 is the rotating clutch 10 embodying the invention. The clutch 10 includes a shaft 12, which has its ends supported by anti-friction bearings 14, 16 associated with stationary members 18, 20. Shaft 12 has an end wall 22 extending therefrom, which has mounted thereon an annular reaction member 24, which defines a clutch input gear 25. A clutch output gear 26 is mounted on shaft 12 by means of bearings 28, and an end wall 30 is mounted on shaft 12 inwardly of bearings 28 and in contact with an annular step 32 formed on shaft 12. A lock nut system, shown generally at 34, is used to seat the end wall 30 against step 32, and to keep bearings 14 and 28 in proper position relative to shaft 12, with the aid of a spacer 36 disposed on shaft 12.

Slidably mounted on shaft 12 between end walls 22, 30 are piston means 38. Such piston means 38 include a piston wall 40 and a movable pressure plate 42.

End wall 22 has extending therefrom a sleeve portion 44, and output gear 26 has extending therefrom a sleeve portion 46 which surrounds sleeve portion 44. A plurality of annular friction plates 48 are disposed between the sleeve portions 44, 46. The plurality of annular friction plates 48 comprise alternating steel plates 50 and discs 52 with friction surfacing thereon. The steel plates 50 are slidably mounted on splines formed on sleeve portion 44, and the discs 52 are slidably mounted on splines formed on sleeve 46. The annular friction plates 48 have the annular reaction member 24 disposed on one side of the plates 48, and the piston means 38 disposed on the other side of the plates 48. Sleeve portion 44 has a plurality of apertures 54 therethrough. Likewise, sleeve portion 46 has a plurality of apertures 56 therethrough. End wall 22, piston means 38, reaction member 24, shaft 12, and plates 48 together form a first chamber A. End wall 30, shaft 12, and piston wall 40 together form a second chamber B, the chambers A and B being on opposite sides of the piston means 38.

The piston means 38, being slidable along shaft 12, are movable toward the reaction member 24 to engage the plates 48, and away from the reaction member 24 to release the plates 18. Resilient springs 50 are interposed between the wall 22 and piston wall 40 to urge the piston means in a plate-disengaging or plate-releasing direction.

An internal bore 58 is defined by shaft 12, and communicates with chamber B by means of a plurality of radial passages 60. Means (not shown) are included for introducing pressurized fluid into bore 58 by a connection 61 and through radial passages 60 into chamber B to move the piston means 38 rightwardly toward the reaction member 24, so that the plates 48 are engaged. The actuating or engaging fluid acts on piston wall 40 from an outer diameter defined by internal surface 62 to an inner diameter defined by inner surface 64. With the clutch 10 so engaged, input torque may be transmitted through input gear 25 to the sleeve portion 46 and the output gear 26 to drive other transmission components (not shown).

Lubricating and cooling fluid from a source (not shown) is supplied to another internal bore 66 defined by shaft 12, through a connection 68. A passage 70 leads from the bore 66 to bearings 28 so that the bearings 28 are lubricated. Such fluid is also supplied to chamber A through a passage 72 communicating with the chamber A. Such fluid supplied through passage 72 to chamber A passes through apertures 54 and is supplied to the plates 48 regardless of whether the clutch 10 is engaged or disengaged. From the plates 48, the fluid exits through the apertures 56 in sleeve portion 46.

Another passage 74 is positioned to provide communication between the bore 66 and chamber A. Such passage 74 is provided to conduct additional fluid to the chamber A. As shown in FIGS. 1 and 2, piston means 38 define a chamber 76, which is positioned to communicate with the passage 74 when the piston means 38 are moved to engage the plates 48 (FIG. 2). In such position, maximum fluid is supplied through passages 75, 76 and through apertures 54 to cool the plates 48. With the piston means 38 moved to release the plates 48 (FIG. 1), the passage 74 is blocked by the piston means 38 to cut off the supply therethrough. It will be seen that supply through the passages 74, 76 to the plates 48 varies from minimum to maximum as the piston means 38 are moved from a plate-released to a plate-engaged position, and from maximum to minimum as the piston means are moved from a plate-engaged to a plate-released position. Meanwhile, fluid is supplied to chamber A (and plates 48) through passage 72 independently of the fluid passing through the passages 74, 76. It is to be understood that the set of passages 74, 76 may be one of a plurality of sets. In the operation of the clutch 10, in the clutch-disengaged state (FIG. 1), the plates 48 are spaced apart, and fluid is supplied through bore 66 and passage 72, into chamber A, through apertures 54, and from apertures 56. Upon introduction of pressurized fluid into bore 58, through passages 60 and into chamber B, piston means 38 are moved to the right in a plate-engaging direction until the plates 48 are engaged. As the piston means 38 move rightward, passage 76 is brought into communication with passage 74, allowing fluid therethrough to chamber A, through apertures 54 to plates 48. Upon further rightward movement of piston means 38, additional fluid is supplied through the apertures 74, 76 until a maximum of fluid is supplied to chamber A when the plates 48 are engaged. In this state, fluid is supplied to the plates 48 through passage 72, and passages 74, 76, at its maximum, the flow therethrough being determined by grooving provided in the friction faces of the plates 48, such grooving being well-known.

As is also well-known, when pressurized fluid is no longer supplied to chamber B, in order to release the clutch 10, the centrifugal pressure head thereof acting on the face of piston means 38 tends to urge the piston means 38 in its rightward, or clutch-engaging position over a piston means 38 diameter indicated by lines 67, 69. However, chamber A is now supplied with a maximum of fluid, and the pressure thereof, along with the corresponding centrifugal head thereof acting on the piston means 38 outer diameter which is determined by the inner engaging portion of the plates 48, as shown by lines 80, 82, urge the piston means 38 leftward in a clutch disengaging direction. Such urging, in addition to the urging of springs 59, acts effectively to disengage the clutch 10.

Upon a degree of movement of the piston means 38 in a clutch-releasing direction, plate 48 separation occurs, allowing relatively free flow of fluid from the chamber A. For a relatively short amount of time, however, the outer diameter upon which the fluid pressure in chamber A acts on piston means 38 is determined by the seal means 93, between the piston means 38 and sleeve portion 44, shown by lines 94, 96. Beyond this point, flow from chamber A is governed by cross-sectional areas of the apertures 54, and the cross-sectional areas of passages 72 and 76. In this embodiment, apertures 54 where chosen as of fairly large cross-sectional area compared with that of passages 72, 76. In such case, upon further movement of the piston means 38 is a clutch-releasing direction, no fluid will collect in chamber A. However, the initial pressure on the piston means 38 to move it in a disengaging direction has been found to be effective in overcoming the tendency of the plates 48 to stick together and to provide more positive separation of the piston means 38 and plates 48.

It may be desirable to limit the areas of the apertures 54 so that the sum of all the areas of the passages 72, 76 is relatively several times larger, for more effective centrifugal retraction. In this case, the effective area of the pressure accumulated in chamber A acting to urge the piston means 38 leftwardly after initial engagement is determined by sealing means 93, i.e., over the diameter shown by lines 94 and 96. In either case, it will be noted that diameter 80, 82 and diameter 94, 96 are both larger than diameter 67, 69 of piston means 38, which is the diameter over which the centrifugal head in chamber B acts. Consequently, even greater positive retraction assistance (i.e., in addition to the force of springs 59), is provided. It will be understood that by properly sizing the cross-sectional areas of apertures 54, and passages 72, 76 and 74, a full range of matched flow rates can be determined as a function of movement of the piston means 38. The chamber A can be positively pressurized regardless of the piston means 38 position through sizing of these passage areas.

Because of such means for providing and regulating clutch releasing pressure, fewer springs of the type 59 have been found necessary for proper clutch disengagement. Positive pressurization of chamber A also provides a supply of fluid to the plates 48 to increase the thermal energy absorption thereby in the engaged and engaging states. This positive pressurization is supplemented by the centrifugal pressure head generated upon rotation of chamber A, which will provide a greater flow of fluid to the plates 48. In addition, the decrease of fluid provided upon disengagement of the plates 48 decreases clutch drag and consequent horsepower loss in such state.

What is claimed is:

1. A clutch comprising: a plurality of annular friction plates; an annular reaction member disposed on one side of the plates; piston means disposed on the other side of the plates and movable toward the reaction member to engage the plates and away from the reaction member to release the plates; first passage means for conducting cooling fluid to adjacent the piston means; second passage means defined by the piston means, communicating with the first passage means with the piston means moved to engage the plates, allowing maximum cooling fluid supply to the plates, the piston means blocking the first passage means with the piston means moved to release the plates, the supply through the first and second passage means to the plates varying from minimum to maximum as the piston means are moved from a plate-released to a plate-engaged position, and from maximum to minimum as the piston means are moved from a plate-engaged to a plate-released position wherein the cooling fluid supply from the second passage means is positioned to induce movement of the piston means in a plate-disengaging direction, and further comprising third passage means for communicating cooling fluid to the plates independent of the cooling fluid passing through the first and second passage means.

2. A rotating clutch comprising: a plurality of annular friction plates; an annular reaction member disposed on one side of the plates; a first end wall associated with the reaction member; piston means disposed on one side of the plates and movable toward the reaction member to engage the plates and away from the reaction member to release the plates, a first chamber being defined between the piston means and first end wall; a second end wall which with the piston means defines a second chamber, the first and second chambers being on opposite sides of the piston means; a first passage for conducting cooling fluid to the first chamber; a second passage defined by the piston means, communicating with the first passage with the piston means moved to engage the plates, allowing maximum cooling fluid supply to the plates, the piston means blocking the first passage with the piston means moved to release the plates, the supply through the first and second passages to the plates varying from minimum to maximum as the piston means are moved from a plate-released to a plate-engaged position, and from maximum to minimum as the piston means are moved from a plate-engaged to a plate-released position; resilient means interposed between the piston means and first end wall to urge the piston means in a plate-disengaging direction; means for selectively applying fluid pressure to the second chamber to move the piston means to engage the plates and selectively releasing fluid pressure from the second chamber to allow movement of the piston means in a plate-releasing direction, the fluid therein under release of pressure acting through centrifugal force to urge the piston means in a clutch-engaging direction; and, the cooling fluid in the first chamber counteracting, by the pressure applied to the piston means thereby, and the centrifugal force of the fluid in said first chamber when said clutch rotates, to further urge the piston means in a clutch-disengaging direction, and further comprising a third passage for communicating cooling fluid to the plates independent of the cooling fluid passing through the first and second passages.

3. The rotating clutch according to claim 2 wherein the cooling fluid in the first chamber urges the piston means over a greater piston means diameter than the fluid in the second chamber.

4. The rotating clutch according to claim 3 and further including means for maintaining pressure in the first chamber when the plates are spaced apart to an extent upon movement of the piston means in a clutch-releasing direction.

5. The rotating clutch according to claim 4 wherein the means for maintaining pressure comprise a sleeve portion associated with the first end wall and defining a plurality of apertures through which the cooling fluid is directed to reach the plates.

* * * * *